(12) United States Patent
Carter

(10) Patent No.: US 8,219,823 B2
(45) Date of Patent: Jul. 10, 2012

(54) SYSTEM FOR AND METHOD OF MANAGING ACCESS TO A SYSTEM USING COMBINATIONS OF USER INFORMATION

(76) Inventor: Ernst B. Carter, San Francisco, CA (US)

( * ) Notice: Subject to any disclaimer, the term of this patent is extended or adjusted under 35 U.S.C. 154(b) by 991 days.

(21) Appl. No.: 11/367,085

(22) Filed: Mar. 3, 2006

(65) Prior Publication Data
US 2007/0107051 A1 May 10, 2007

Related U.S. Application Data

(60) Provisional application No. 60/658,755, filed on Mar. 4, 2005.

(51) Int. Cl.
*G06F 21/00* (2006.01)
(52) U.S. Cl. .......... 713/182; 726/21; 707/749; 707/784; 707/786; 713/183; 713/166
(58) Field of Classification Search .............. 726/21, 726/2; 713/202, 182–183, 166, 186; 707/749, 707/784, 786
See application file for complete search history.

(56) References Cited

U.S. PATENT DOCUMENTS

| | | | |
|---|---|---|---|
| 4,914,653 A | 4/1990 | Bishop et al. | |
| 5,029,206 A | 7/1991 | Marino, Jr. et al. | 380/4 |
| 5,093,913 A | 3/1992 | Bishop et al. | |
| 5,454,039 A | 9/1995 | Coppersmith et al. | 380/28 |
| 5,584,023 A | 12/1996 | Hsu | 395/620 |
| 5,721,777 A | 2/1998 | Blaze | 380/4 |
| 5,727,206 A | 3/1998 | Fish et al. | 395/618 |
| 5,729,710 A | 3/1998 | Magee et al. | 395/413 |
| 5,765,153 A | 6/1998 | Benantar et al. | 707/9 |
| 5,774,525 A | 6/1998 | Kanevsky et al. | 379/88 |
| 5,787,169 A | 7/1998 | Eldridge et al. | 380/4 |
| 5,841,976 A | 11/1998 | Tai et al. | 395/200.34 |
| 5,903,881 A | 5/1999 | Schrader et al. | 705/42 |
| 5,991,399 A | 11/1999 | Graunke et al. | 380/4 |

(Continued)

FOREIGN PATENT DOCUMENTS
EP 1 292 067 A1 12/2002
(Continued)

OTHER PUBLICATIONS

Kayem, Anne V.D.M, On replacing cryptographic keys in hierarchical key management systems.,Journal of Computer Security; 2008, vol. 16 Issue 3, p. 289-309, 21p, 7 Diagrams, 1 Chart, 3 Graphs.*

(Continued)

*Primary Examiner* — Taghi Arani
*Assistant Examiner* — Angela Holmes
(74) *Attorney, Agent, or Firm* — Haverstock & Owens LLP

(57) ABSTRACT

The present invention is directed to systems for and methods of controlling access to computer systems. A method in accordance with the present invention comprises performing a test that includes comparing input responses to randomly selected questions with corresponding pre-determined responses to the questions and granting access to the system in the event the test is passed. A first condition of passing the test is that each input response matches a corresponding pre-determined response. Once passing the test, the user is granted permissions to access data based on his position. For example, a corporate director generally has greater permissions than an engineer. Preferably, the user's permissions determine an encryption key and a decryption key that the user is able to use to access protected data.

37 Claims, 13 Drawing Sheets

U.S. PATENT DOCUMENTS

| | | | |
|---|---|---|---|
| 5,991,414 A | 11/1999 | Garay et al. | 380/25 |
| 6,023,506 A | 2/2000 | Ote et al. | 380/4 |
| 6,065,037 A | 5/2000 | Hitz et al. | |
| 6,185,681 B1 | 2/2001 | Zizzi | 713/165 |
| 6,205,417 B1 | 3/2001 | Butts et al. | 703/27 |
| 6,249,866 B1 | 6/2001 | Brundrett et al. | |
| 6,351,813 B1* | 2/2002 | Mooney et al. | 713/185 |
| 6,477,545 B1 | 11/2002 | LaRue | 707/201 |
| 6,681,305 B1 | 1/2004 | Franke et al. | 711/170 |
| 6,754,820 B1* | 6/2004 | Scheidt et al. | 713/166 |
| 6,836,888 B1 | 12/2004 | Basu et al. | 718/104 |
| 6,938,166 B1 | 8/2005 | Sarfati et al. | 713/200 |
| 6,957,330 B1 | 10/2005 | Hughes | 713/163 |
| 7,051,209 B1* | 5/2006 | Brickell | 713/183 |
| 7,185,192 B1* | 2/2007 | Kahn | 713/155 |
| 7,231,657 B2* | 6/2007 | Honarvar et al. | 726/2 |
| 7,243,370 B2 | 7/2007 | Bobde et al. | 726/10 |
| 7,313,694 B2 | 12/2007 | Riedel et al. | 713/165 |
| 7,353,535 B2 | 4/2008 | Kaler et al. | 726/5 |
| 2002/0065876 A1 | 5/2002 | Chien et al. | 709/203 |
| 2003/0005300 A1 | 1/2003 | Noble et al. | 713/172 |
| 2003/0187784 A1 | 10/2003 | Maritzen et al. | 705/39 |
| 2003/0236745 A1 | 12/2003 | Hartsell et al. | |
| 2004/0093455 A1 | 5/2004 | Duncan et al. | |
| 2004/0123162 A1* | 6/2004 | Antell et al. | 713/202 |
| 2005/0039057 A1* | 2/2005 | Bagga et al. | 713/202 |
| 2005/0191609 A1* | 9/2005 | Fadel et al. | 434/322 |
| 2006/0095779 A9 | 5/2006 | Bhat et al. | 713/182 |
| 2006/0143350 A1 | 6/2006 | Miloushev et al. | |
| 2007/0113229 A1 | 5/2007 | Serghi et al. | |

FOREIGN PATENT DOCUMENTS

| | | | |
|---|---|---|---|
| JP | 2214887 A | | 8/1990 |
| JP | 9251426 A | | 9/1997 |
| JP | 2001092718 A | | 4/2001 |
| JP | 2001516913 A | | 10/2001 |
| JP | 2002123427 A | | 4/2002 |
| WO | 99/14652 A1 | | 3/1999 |
| WO | 0067130 A1 | | 11/2000 |
| WO | 02/19592 A2 | | 3/2002 |

OTHER PUBLICATIONS

Crampton, J.; Martin, K.; Wild, P.; On key assignment for hierarchical access control, Computer Security Foundations Workshop, 2006. 19th IEEE.*

Akl, Selim G. Taylor, Peter D., Cryptographic solution to a problem of access control in a hierarchy, Aug. 1983 ,vol. 1 Issue: 3 on pp. 239-248 ISSN: 0734-2071.*

Erez Zakok et al., "Cryptfs: A Stackable Vnode Level Encryption File System", pp. 1-14, Computer Science Department, Columbia University, 1998.

Matt Blaze, "A Cryptographic File System for Unix", pp. 9-16, AT&T Bell Laboratories 101 Crawfords Corner Road, Room 4G-634 Holmdel, NJ 07733, 1993, 1st Conf.-COmputer & Comm. Security '93-11/93—VA, USA.

Roy H. Campbell et al., "An Object-Oriented Multimedia Operating System", 1995 IEE, pp. 90-94, University of Illinois at Urban-Champaign.

Robert L. Scheier, "Trusted Operating Systems: The Ultimate Defense", Nov. 6, 2000, pp. 70-72, Computerworld.

Mazieres, "A toolkit for user-level file systems", Jan. 2001, pp. 1-14, Department of Computer Science, NYU.

Yu et al., "A Cryptographic File System Supporting Multi-Level Security", Dec. 2002, pp. 1-8, Electronics and Telecommunications Research Institute, Daejeon, Korea.

Inamura, Tsuyoshi, "Encrypton File System", Open Design, Dec. 1, 1997, vol. 4, No. 6, pp. 112-125.

Niels Provos, "Encrypting Virtual Memory", Center for Information Technology Integration, University of Michigan, pp. 1-10, Apr. 2000.

Theo de Raadt et al., "Cryptography in OpenBSD: An Overview", The OpenBSD Project, pp. 1-9, 1999.

Stefan Ludwig et al., "File System Encryption with Integrated User Management", ACM SIGOPS Operating System Review Archive, vol. 35, Issue 4, pp. 88-93, Oct. 2001.

Matt Blaze, "A Cryptographic File System for Unix", A&T& Bell Laboratories, Holmdel, New Jersey, pp. 1-8, 1993.

* cited by examiner

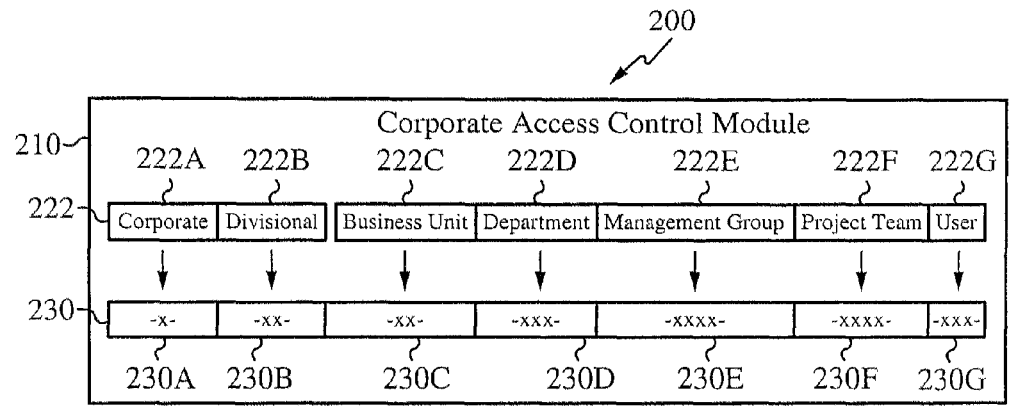
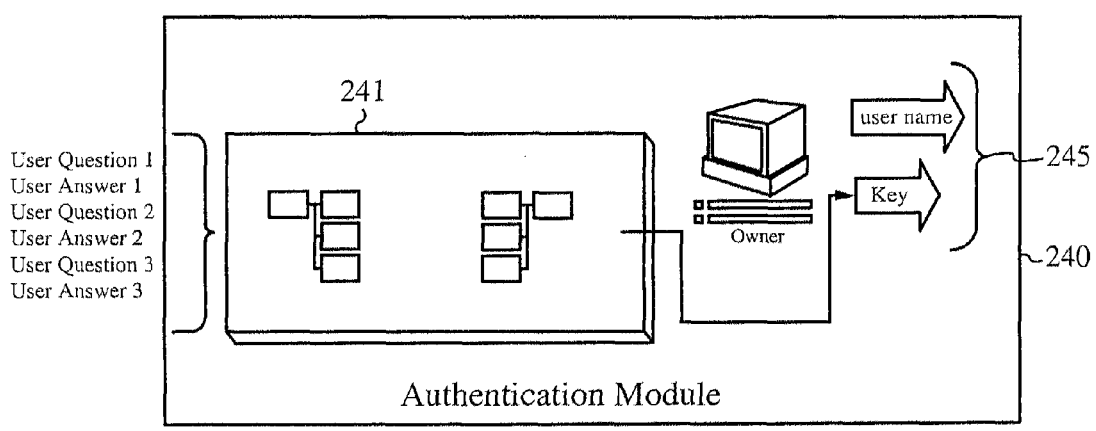
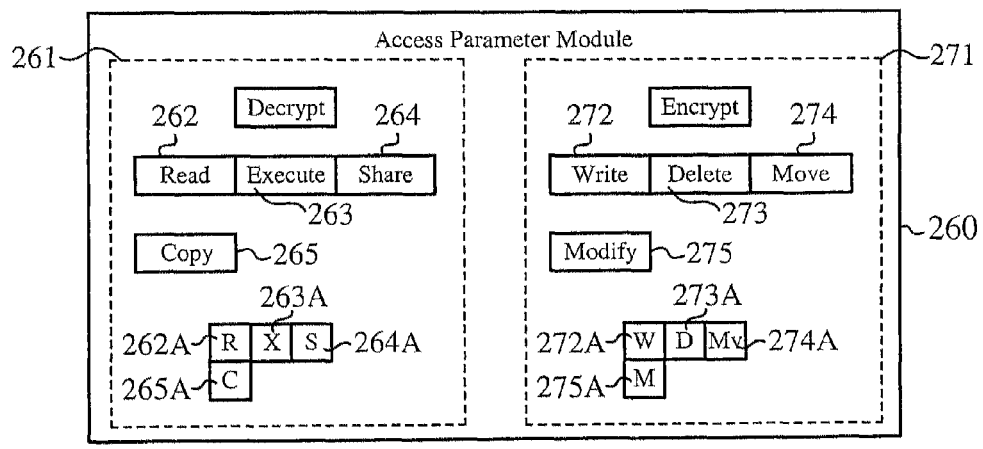
Fig. 3

| NSA\U | 000 | 001 | 011 | 010 | 100 | 101 | 111 | 110 |
|---|---|---|---|---|---|---|---|---|
| 000 | | | | | | | 28 | |
| 001 | | | | | | | 29① | |
| 011 | | | | | | | 31① | |
| 010 | | | | | | 18① | 22① | 30① 26① |
| 100 | | | | | | | | |
| 101 | | | | | | | | |
| 111 | | | | | | | | |
| 110 | | | | | | | | |

| 10 | 605A | 0001 | 605B | —605 |
| 8  | 606A | 0004 | 606B | —606 |
| 22 | 607A | 0010 | 607B | —607 |

601

| 6  | 612A | 0000 | 621B | —621 |
| 16 | 622A | 0003 | 622B | —622 |
| 3  | 623A | 0007 | 623B | —623 |

620

| 0  | 641A | 0002 | 641B | —641 |
| 30 | 642A | 0005 | 642B | —642 |
| 29 | 643A | 0015 | 643B | —643 |

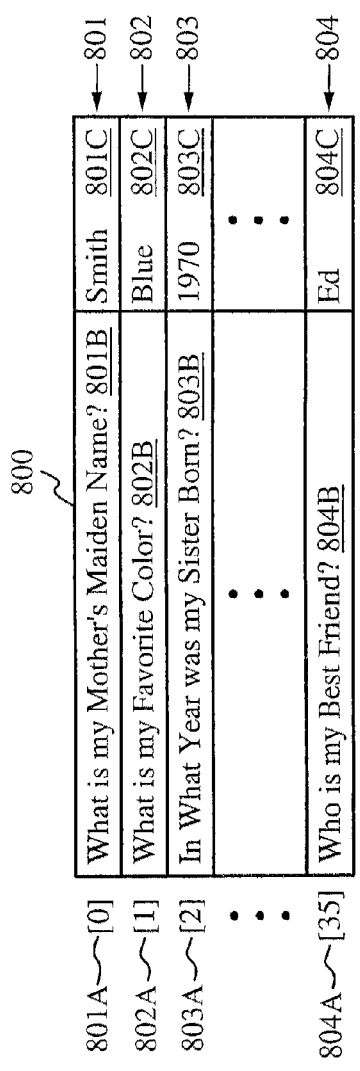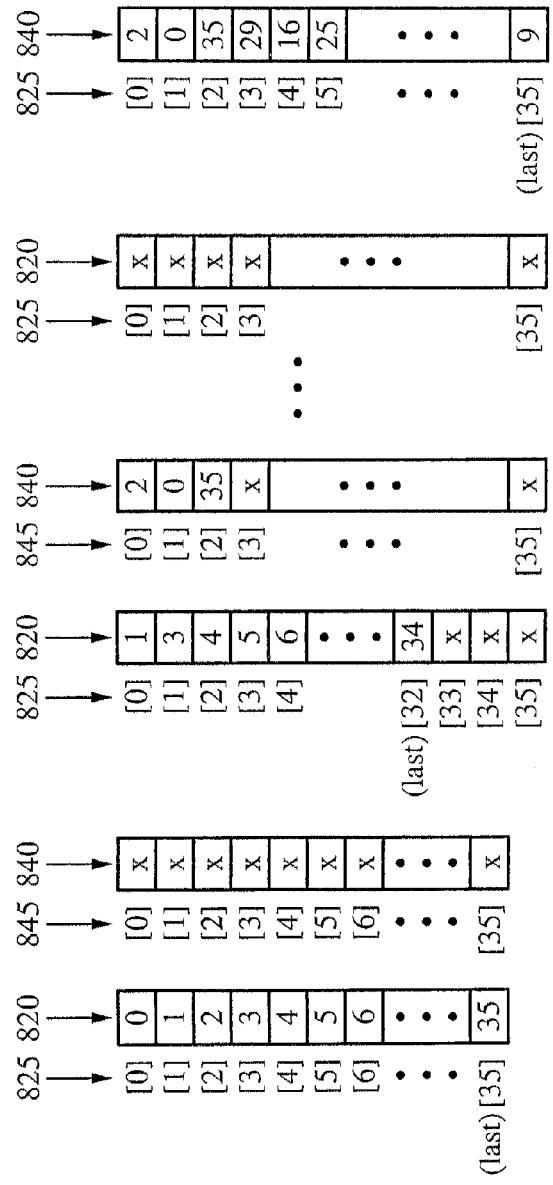

SYSTEM FOR AND METHOD OF MANAGING ACCESS TO A SYSTEM USING COMBINATIONS OF USER INFORMATION

RELATED APPLICATION

This application claims priority under 35 U.S.C. §119(e) of the U.S. provisional patent application Ser. No. 60/658,755, filed Mar. 4, 2005, and titled "Key Management System," which is hereby incorporated by reference.

FIELD OF THE INVENTION

This invention relates to computer security. More particularly, this invention relates to systems for and methods of increasing the security of computer systems using combinations of user-supplied information.

BACKGROUND OF THE INVENTION

Today, many computer systems rely on a single-phrase password system to grant access to the computer system. Single-phrase password systems are easy to circumvent, such as by interception, by "brute-force" software programs that generate multiple combinations of characters, which are entered into the system, or by programs that snoop around system memory looking for possible passwords. Furthermore, many people write down their passwords, because they are non-intuitive and thus difficult to remember.

Some prior art systems use one-time password modules. Using these modules, a user inputs a seed into a one-time password generator, which generates a list of multiple passwords of seemingly random characters. The system on which these passwords are to be used will accept each password on the list only once. Thus, even if an eavesdropper were to intercept a password that an authorized user has used or is using to log on to the system, the eavesdropper cannot use the password. Because it has been used by the authorized user, it cannot be used again.

One-time password modules have the disadvantage of generating strings of random characters that are incomprehensive, non-intuitive, and thus difficult to remember. Users often write the list of passwords down, compromising the security of the system if the list is found and later used by an unauthorized user.

Other prior art systems use biometric information to grant access to a computer system. These systems use biometric hardware, which may not fit on systems that have a small footprint, and associated software.

SUMMARY OF THE INVENTION

The present invention is used to control access to protected data, data that is protected by encryption, by limiting access to directories in which it stored, or by other means. Generally, the data is owned or controlled by organizational levels in an entity. For example, a corporate level owns and controls confidential data that only those on the corporate level, such as chief operating officers (COOs) and the like, should have access to. Conversely, an engineering level owns and controls data that not only engineers, but also the COO should have access to. Users are granted permission to access data by authenticating themselves and then receiving encryption and decryption keys that allow them to access protected data.

Embodiments of the invention provide increased security by randomly selecting questions used to challenge anyone attempting to log on to the system. By randomly selecting questions and ensuring that the selected questions are not asked too often, the system ensures that even if an unauthorized user learns of the questions and answers used during one logon session, those answers cannot later be used to gain unauthorized access to the system.

In one aspect of the present invention, a method of controlling access to a system comprises performing a test that includes comparing input responses to randomly selected questions with corresponding pre-determined responses to the questions and granting access to the system in the event the test is passed. A first condition of passing the test is that each input response matches a corresponding pre-determined response. A pre-determined response is a pre-determined correct answer to its corresponding question. Alternatively, a pre-determined response is a pre-determined incorrect answer to its corresponding question.

In one embodiment, the method further comprises presenting the questions sequentially. In an alternative embodiment, the method further comprises presenting the questions concurrently. In one embodiment, a second condition of passing the test is entering the input responses into the system in a pre-determined sequence.

Questions are able to be presented using any number of means including, but not limited to, display screens, voice modules, and the like. Responses are able to be received using any number of means including, but not limited to, keyboards, mice, touch screens, biometric sensors, joy sticks, and voice recognition modules.

The method further comprises displaying questions and candidate responses in a multiple choice format. A first condition of passing the test is selecting a pre-determined question and providing a corresponding pre-determined response to the question. The test is failed by selecting a question that has no corresponding pre-determined response. In one embodiment, the method further comprises displaying candidate responses that include correct answers to the questions and also incorrect answers to the questions.

Preferably, granting access to the system comprises decrypting information on the system using a decryption key, encrypting information using an encryption key, or both.

The method further comprises selecting a question for display based on a time that the question was last displayed. Alternatively, or additionally, the method further comprises selecting a question for display based on a number of times the question was displayed within a pre-determined time period.

In a second aspect of the present invention, a method of controlling access to a system comprises selecting a combination of questions for presentation to a user; determining a classification of the user on the system; and granting access to an area of the system based on both responses to the combination of questions and the classification. The classification corresponds to a membership of the user in one or more of a corporation, a division, a department, a group, and a project. Preferably, the combination of questions is randomly selected.

In one embodiment, the area of the system corresponds to any one or more of a disk partition, a file system, a portion of a database, a directory, an electronic folder, an electronic file, and a data object.

The method further comprises displaying the combination of questions using a user interface protocol. The user interface protocol comprises displaying candidate responses to the questions as multiple choices.

Preferably, the method further comprises encrypting a response input by the user using an encryption key to generate an encrypted input response and granting access to the system in the event that the encrypted input response matches a corresponding encrypted system response. Granting access to the system comprises decrypting the area of the system using a decryption key corresponding to the encryption key. In a preferred embodiment, encryption and decryption are performed in a system kernel. In addition, granting access to the area comprises determining permissions to the area corresponding to the classification. The classification has a hierarchical structure that corresponds to an organizational structure of an entity.

In a third aspect of the present invention, a module for controlling access to a system comprises means for randomly selecting a combination of questions and means for granting access to the system in the event user responses to the questions match corresponding system responses to the questions. The module further comprises means for displaying the combination of questions. The means for displaying displays the combination of questions sequentially. Alternatively, the means for displaying displays the combination of questions concurrently. Preferably, the means for selecting a combination of questions comprises a memory for storing information for tracking questions presented to a user.

In a fourth aspect of the present invention, a module for controlling access to a system comprises means for displaying a randomly selected combination of questions to a user and a grant component for granting access to the system based on a classification of the user and responses of the user to the questions. Granting access to the system comprises granting access to one of an encryption key, a decryption key, or both, for accessing data on the system.

In a fifth aspect of the present invention, a network of devices comprises one or more user devices and an access control module. The access control module is for granting access to protected data to multiple users using the user devices. Each user from the multiple users is granted access based on his position in an organization and on his responses to a combination of randomly selected questions.

BRIEF DESCRIPTION OF THE SEVERAL VIEWS OF THE DRAWINGS

FIG. 3 shows a corporate access control module, an authentication module, and an access parameter module in accordance with the present invention.

FIG. 5 shows a Karnaugh map corresponding to permissions for granting access to a user in accordance with the present invention.

FIG. 10 shows another data structure for tracking questions already asked a user in accordance with the present invention.

FIG. 13 shows a question and answer array in accordance with one embodiment of the present invention.

FIGS. 14A-C show arrays used to randomly select questions and answers in accordance with one embodiment of the present invention, after authorizing a user at three different times.

DETAILED DESCRIPTION OF THE INVENTION

In accordance with the present invention, a system provides access to system data based on (1) a user's ability to answer randomly selected questions, (2) a user's classification within an organization, or (3) both. By presenting randomly selected questions to a user, the system ensures that even an eavesdropper cannot use answers provided to the questions, since those questions are unlikely to be asked (and their corresponding answers expected) the next time the system is accessed. As another or additional security feature, the system checks the classification or position of the user (e.g., corporate director, manager in accounting, or engineer) and grants the user access to only those data for which he has permission. In a preferred embodiment, a user must correctly answer a combination of three randomly selected questions. In alternative embodiments, the user must correctly answer fewer than three or more than three randomly selected questions.

Figure 1:
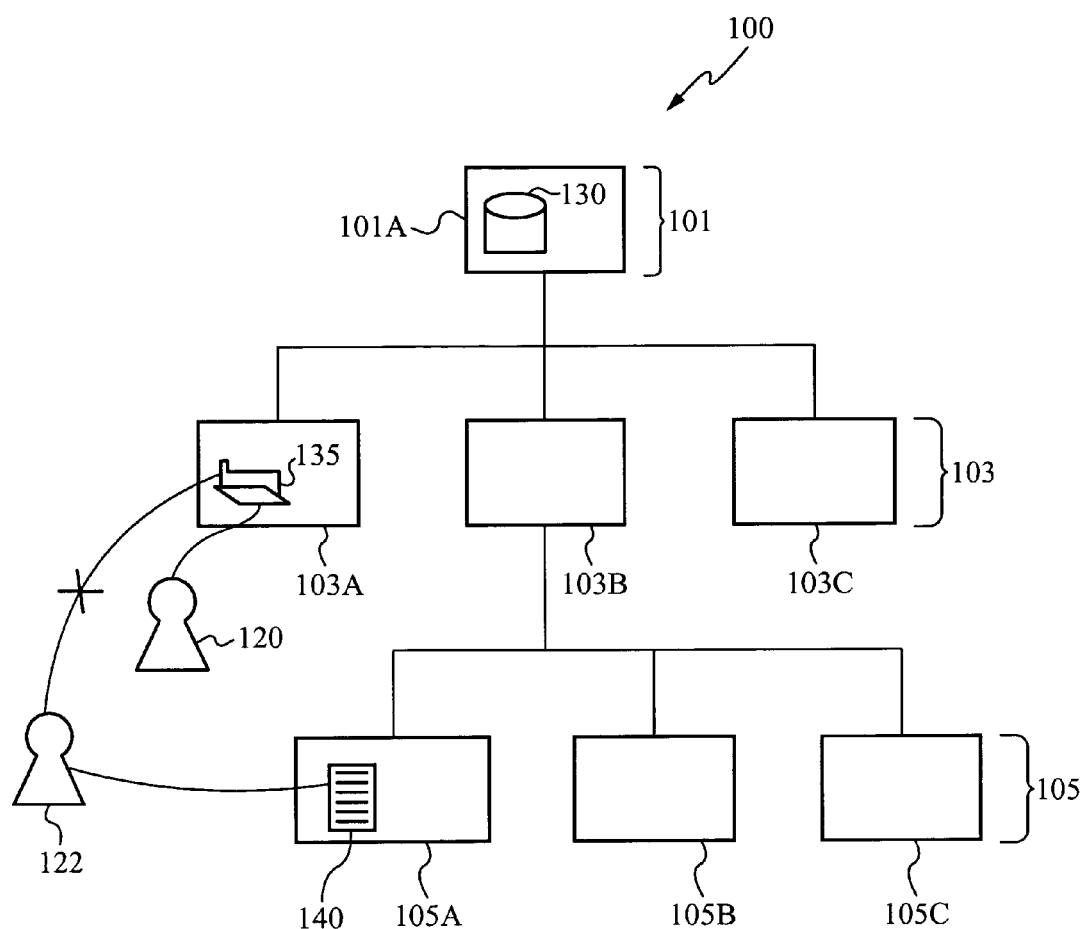
FIG. 1 shows hierarchically-arranged levels of an organization, data owned within several of the levels, and users attempting to access the data in accordance with the present invention.

FIG. 1 shows an exemplary hierarchical tree structure 100 illustrating several organizational levels and used to explain embodiments of the present invention. The hierarchical structure 100 includes a corporate level 101, a division level 103, and a project level 105. The corporate level 101 contains one corporation 101A, the division level 103 contains three divisions 103A-C, and the project level 105 contains three projects 105A-C. The corporation 101A owns a database 130 to which access is controlled (a "protected" database), the division 103A owns a protected electronic folder 135, and the project 105A owns a protected electronic file 140. A user 120 is part of the division level 103 and a user 122 is part of the project level 105.

In this example, both of the users 120 and 122 have successfully answered randomly selected questions to verify their identity to the system and thus their position in the organizational hierarchy (e.g., a corporate director, manager in accounting, or engineer). As shown by the solid line connecting the user 120 to the folder 135, the user 120 is able to access the protected folder 135 because (1) he answered randomly generated questions correctly and (2) his position in the organizational hierarchy permits him to access the folder 135. Similarly, as shown by the "X" breaking the line connecting the user 122 to the folder 135, the position of the user 122 does not allow him to access the folder 135. The unbroken line connecting the user 122 to the protected file 140 indicates that the user 122 is allowed to access the protected file 140. This example thus illustrates how embodiments of the invention grant access to system data based on users' positions in an organizational hierarchy. As described in more detail below, the system grants access to data on the system by associating "permissions" for the data with the user.

This example also illustrates another advantage of the present invention. When the user 120 verifies his identity, he is challenged with the randomly selected combination of questions A, B, and C, to which he provides the correct responses A', B', and C'. Even if the user 122 were to view or otherwise intercept the responses A', B' and C', and tried to log on as the user 120, he would be challenged with a new randomly selected combination of questions D, E, F, with the corresponding correct responses D', E', and F'. The responses A', B', and C', which the user 122 now has, cannot be used by the user 122 to log on to the system as the user 120. Still using this example, embodiments of the system check to make sure that the questions A, B, and C are not asked again, either alone or in the same combination, within a pre-determined time period or within a pre-determined number of iterations.

As discussed in more detail below, in an initialization step, the user 120 enters the questions A, B, C, D, E, and F and provides the corresponding responses A', B', C', D', E', and F'. The user 120 generally chooses personal questions to which few within his organization know the answers, questions such as "What is my favorite team?" or "How many nephews do I have?" The user 120 is also able to select "incorrect" responses to questions. For example, for the question "How old am I," the user 120 is able to select the response "22" even though the user 120 is much older. In other words, by responding with the "incorrect" answer "22," the user 120 is able to verify his identity and thus access the system.

It will be appreciated that the system is able to grant a user access to system data in any number of ways. These include, but are not limited to, (1) granting to the user or user applications a key for decrypting system data (such as when the user wishes to read data that has been encrypted and stored on the system) or another key for encrypting data (such as when the user wishes to write data) and (2) granting the user permission to traverse a directory, to name a few ways. Preferably, when a user is granted a key, its use is "transparent"; that is, the user does not see the key or do anything special to use it. Once he is granted access to data, the operating system or other applications use the encryption and decryption keys without user interference.

FIG. 1 shows a rather simple organizational structure used to describe the invention. Embodiments of the present invention are able to be used with more complex organizational structures, tree-like or not, such as one in which a corporation contains multiple divisions, each division contains multiple business units, each business unit contains multiple departments, each department contains multiple groups, each group contains multiple projects, and each project contains multiple individuals.

Figure 2:
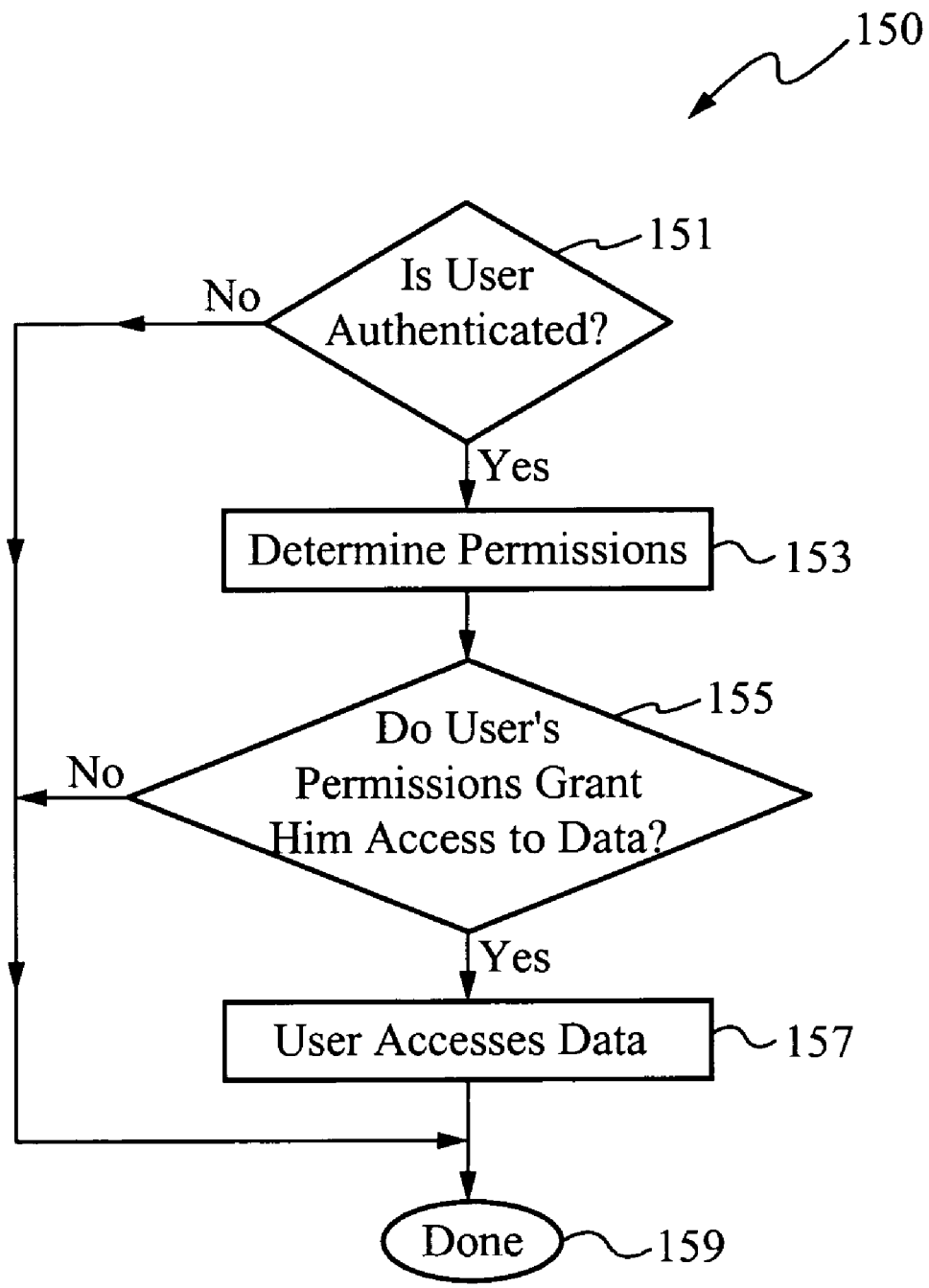
FIG. 2 shows the steps of a process for authenticating a user and using permissions granted to him for accessing data, all in accordance with the present invention.

FIG. 2 shows the steps of a process 150 for determining whether a user is able to access protected data. First, in the step 151, it is determined whether a user is authenticated, such as by correctly answering a randomly selected combination of questions. If the user answers the questions correctly, the process continues to the step 153; otherwise, the process continues to the step 159, where the process ends. In the step 153, the process determines permissions to grant the user, based in whole or in part on his position in an organization that owns the system. Next, in the step 155, the process determines whether the user's permissions allow him to access the data. If the user's permissions do allow him to access the data, the process continues to the step 157, where the user accesses the data, from which the process proceeds to the step 159, where the process ends. If, in the step 155, the process determines that the user is not allowed to access the data, the process continues to the step 159, where the process ends.

FIG. 3 shows modules of a system 200 in accordance with the present invention. The system 200 comprises a corporate access control module 210, an authentication module 240, and an access parameter module 260. The corporate access control module 210 includes a corporate vector 222 and a corresponding permissions vector 230. The corporate vector 222 has the components 222A-G, and the permissions vector 230 contains permissions for each component. For example, a corporate level 222A has permissions 230A (shown with the placeholder "-x-"), a divisional level 222B has permissions 230B, a business unit level 222C has permissions 230C, a department level 222D has permissions 230D, a management group ("group") level 222E has permissions 230E, a project team ("team") level 222F has permissions 230F, and a user level 222G has permissions 230G. The exemplary permissions 230A define the permissions of a user at the corporate level 222A. As one example, a user at the corporate level 222A has permissions to access any file anywhere on the system, regardless of what level owns the file. In contrast, the permissions 230E of a user at the group level 222E allows that user to access only data owned by that group. Preferably, the components 230A-G of the permissions vector 230 are set by a system administrator during system initialization. Alternatively, or additionally, a head of a level (e.g., a department manager) sets permissions for members in the level.

In one embodiment, protected data are encrypted with encryption keys that have corresponding decryption keys; permissions define which keys a user is granted and thus which data a user is able to decrypt and thus access. Thus, for example, a user at the corporate level is granted a corporate encryption key and a corporate decryption key (collectively called a corporate master key); a user at the divisional level is granted a divisional master key; etc. The corporate key decrypts and encrypts all data within the user's organization. Similarly, a divisional master key decrypts and encrypts all data owned by the business unit level, the department unit level, all the way down to the user level. The permissions vector 230 is thus used to define permissions to all users based on their positions in the organizational hierarchy.

The access parameter module 260 illustrates the components of a permissions sub-vector (e.g., 230A) of the permissions vector (e.g., 230), containing permissions for both encrypting, such as when a user is writing to a protected area, and decrypting, such as when a user is reading from a protected area. The permissions for decrypting are indicated by the sub-vector 261, which indicates permissions for read 262, execute 263, share 264, and copy 265, shown by the corresponding code "R" 262A (for read), "X" 263A (for execute), "S" 264A (for share), and "C" 265A (for copy), generally referred to as permissions "RXSC." Similarly, the permissions for encrypting are indicated by the sub-vector 271, which indicates permissions for write 272, delete 273, move 274, and modify 275, shown by the corresponding code "W" 272A (for write), "D" 273A (for delete), "Mv" 274A (for move), and "M" 275A (for modify), generally referred to as permissions "WDMvM." It will be appreciated that other permissions and combinations of permissions are allowable in accordance with the present invention, such as "not copy."

The authentication module 240 comprises a question and response component 241 that, as shown in the example of FIG. 2, presents and receives, respectively, the question "User Question 1" and the corresponding response "User Answer 1"; the question "User Question 2" and the corresponding response "User Answer 2"; and the question "User Question 3" and the corresponding response "User Answer 3." After authenticating the user based on "User Answer 1," "User Answer 2," and "User Answer 3," the system determines a user name and key combination 245, which grants the user permission to access system data in accordance with the present invention.

In one embodiment, questions and answers are encrypted and stored on the system. This ensures that the question and answer pairs stored on the system cannot be read and later used by an unauthorized user. Thus, when a user accesses the system, a selected question is decrypted and presented to a user. The user's response is encrypted and compared to the encrypted response stored on the system to determine whether the user entered a correct response.

Referring to the example of FIG. 3, in operation, the permission vector 230 is generated by a system administrator, with the corresponding access parameters 261 and 271. In a preferred embodiment, the system administrator is automated by a key management system, and the permission vector 230 is generated when a user is registered on a system. Later, a user uses the authentication module 240 to verify his identity. After verifying the user's identity, the authentication module 240 uses the access parameters 261 and 271 to determine a key for granting a user. The system then uses the key for granting the user access to system data.

Figure 4:
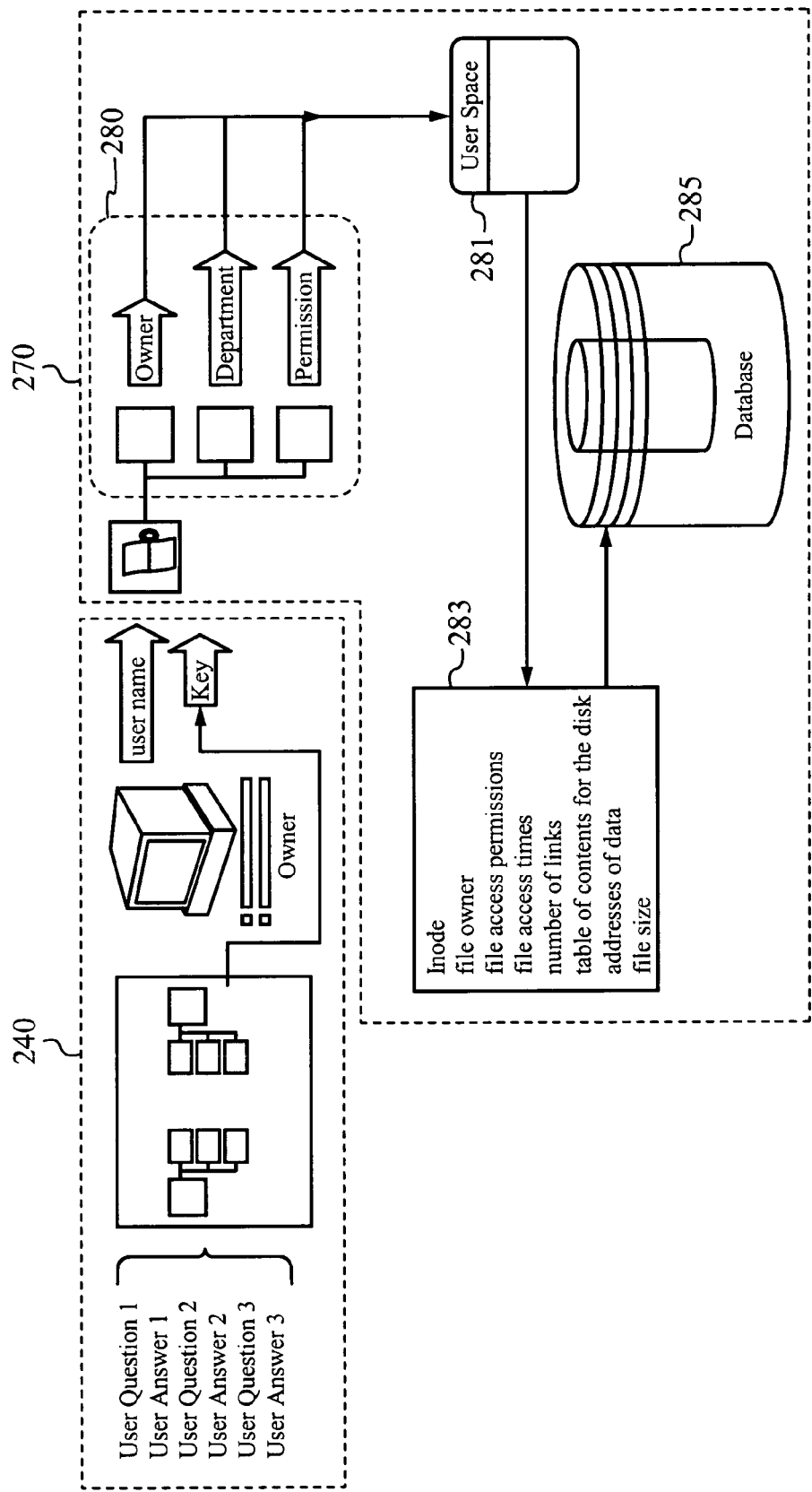
FIG. 4 shows how the authentication module in FIG. 3 is used to generate keys for accessing protected data in accordance with the present invention.

FIG. 4 is used to explain in more detail the operation of one embodiment of the present invention. FIG. 4 shows the authentication module 240 of FIG. 3 coupled to an access module 270. The access module 270 receives the user name and key combination generated by the authentication module 240, determines an owner, department, and permissions (collectively, 280) from the user name and key combination, which is then used to make system calls 281 in the system user space 281 to access protected system data in accordance with the present invention. Preferably, to avoid conflicts, the user name is a unique identifier, such as a user identifier. In some embodiments, the user identifier is encoded and compared to a stored encoded user identifier to authenticate the user. System calls into the user space are further described in U.S. patent application Ser. No. 10/648,630, titled "Encrypting Operating System," and filed Aug. 25, 2003, which is hereby incorporated by reference. The system calls access, for example, an inode 283 to access a protected database 285.

Figure 5:
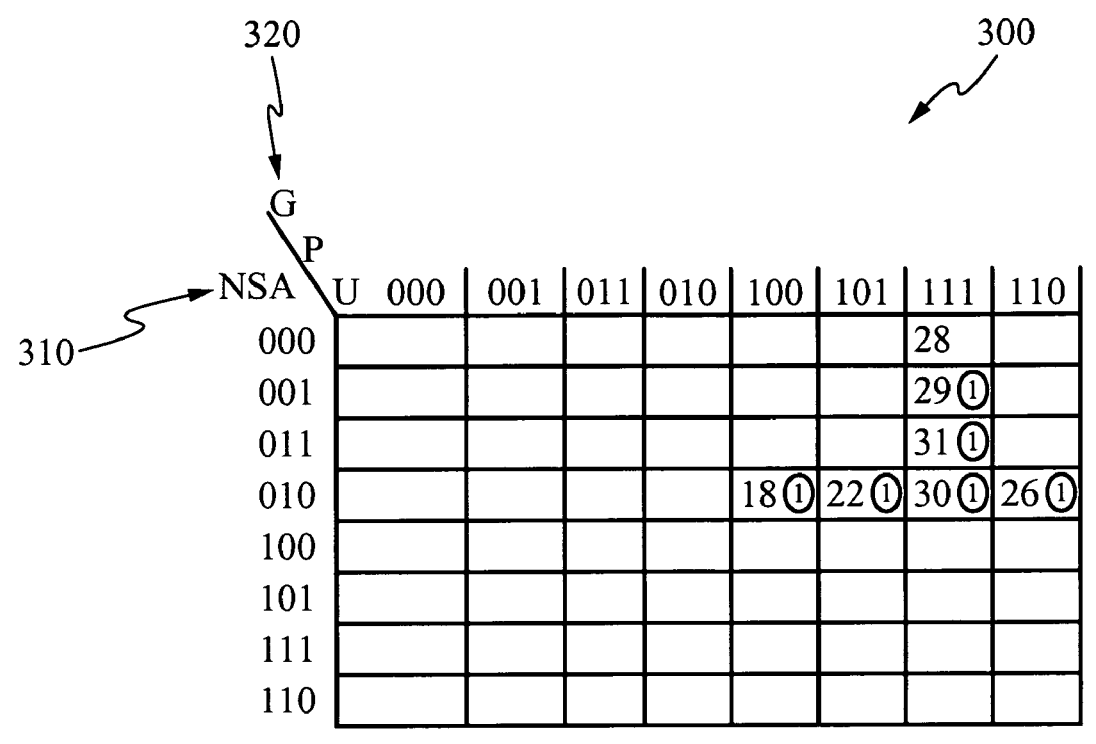

Several methods exist for determining when a user is to be granted access to a key for encrypting and decrypting system data. One method uses a Karnaugh Map, used to determine a logic structure, helpful in writing software for implementing embodiments of the present invention. FIG. 5 shows a Karnaugh map 300 having rows 310 and columns 320. The Karnaugh map 300 is easily understood by those skilled in the art and is not discussed in great detail here. Each of the rows 310 is labeled with a three-bit identifier. Each bit corresponds to an access to protected data, labeled here as "N," for "Non Access"; "S," for "Shared Access"; and "A," for "Access." Each of the columns is also labeled with a three-bit identifier. Each bit corresponds to an organizational level, labeled here as "G," for group; "P," for project; and "U," for user. A circled "1" in the intersection of one of the rows 310 and one of the columns 320 indicates that access to protected data is allowed. The non-circled number in the intersection corresponds to a similarly numbered logic component shown in the corresponding logic circuit 350, illustrated in FIG. 6, used, for example, to implement the Karnaugh map 300 in software. The logic circuit 350 shows as inputs (1) a corporate vector 353 corresponding to the group 042 and the project 04 and (2) the permissions vector 355 for non-access, shared access, and access. The output 360 of the logic circuit 350 determines whether a decrypt command, signaling that the user 001, who belongs to the group 042, and the project 04, is granted access to a decryption key.

Figure 6:
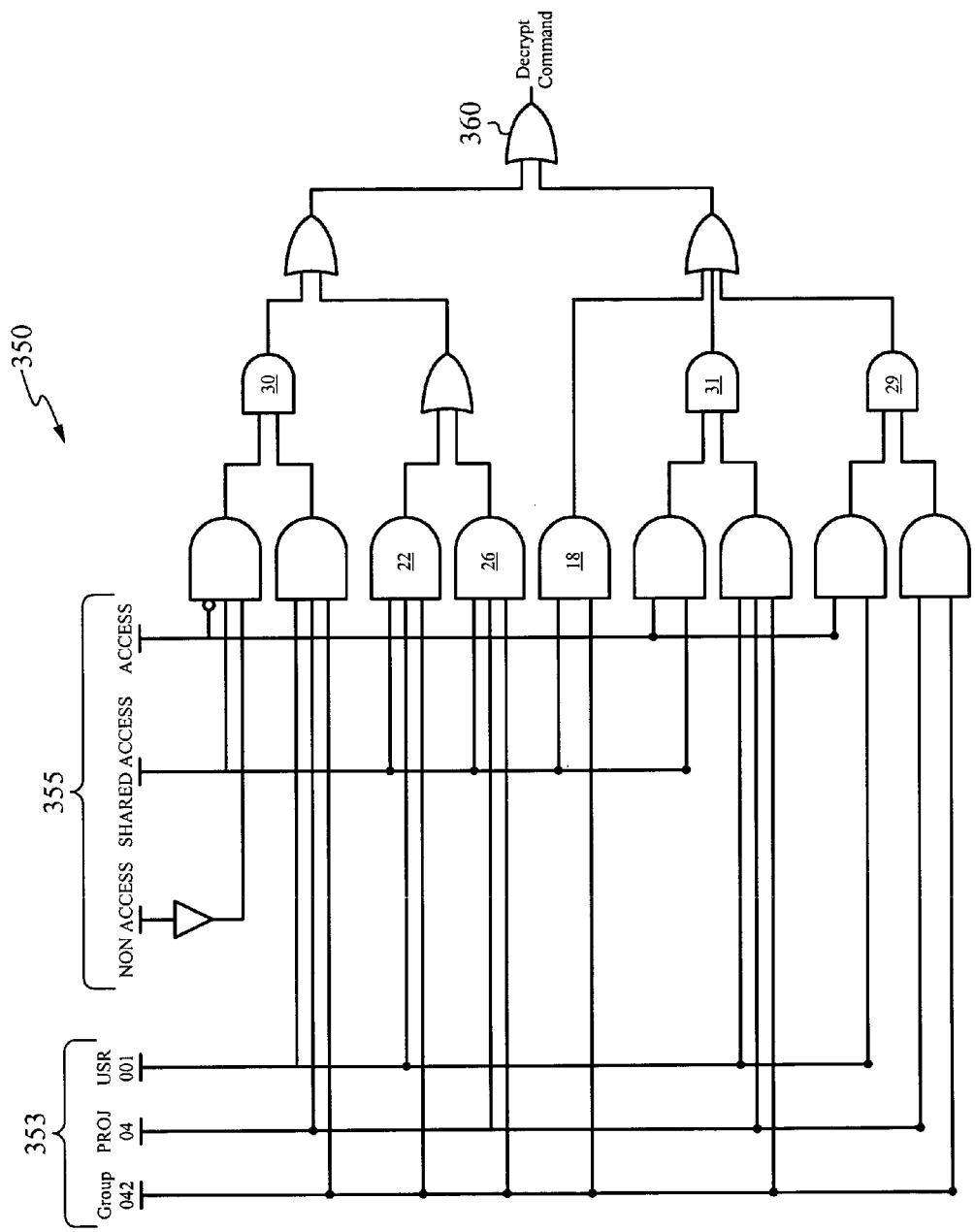
FIG. 6 shows a logic diagram corresponding to the Karnaugh map of FIG. 5.

Those skilled in the art will recognize that FIG. 5 and the corresponding FIG. 6 correspond to only the lower half of a logic circuit for implementing the present invention, since they are the end point of the chain of command over the access rights. Those skilled in the art will recognize how to construct the upper half of the logic circuit. Those skilled in the art will also recognize that a logic circuit similar to that shown in FIG. 6 is used to generate an encryption command, signaling that the user is allowed, for example, access, shared access, copy, read, or no copy access to an encryption key.

Figure 7:
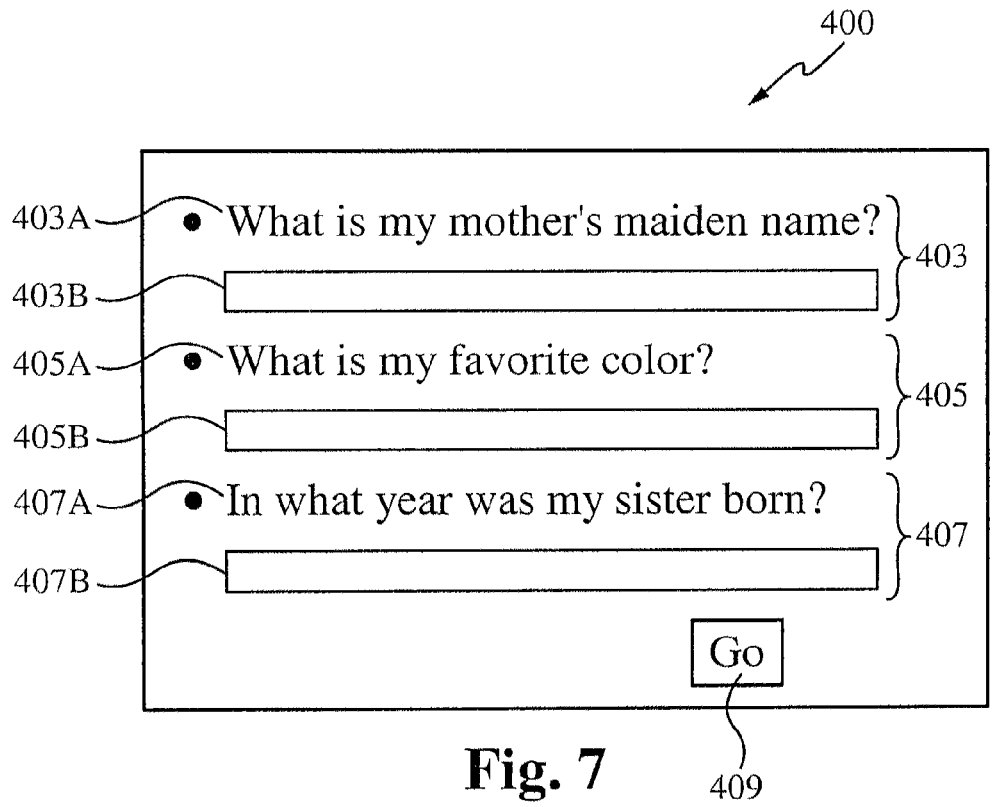
FIG. 7 shows a graphical user interface (GUI) displaying a combination of questions for challenging a user in accordance with the present invention.

FIG. 7 shows a graphical user interface (GUI) 400 that forms part of an authentication module, used together with a corporate access control module in accordance with the present invention, or independently of the corporate access control module. Using both together increases the security provided by a system of the present invention. The GUI 400 displays (1) a first question 403A and an area 403B (collectively, block 403) to input its corresponding response; (2) a second question 405A and an area 405B (collectively, block 405) to input its corresponding response; and (3) a third question 407A and an area 407C (collectively, block 407) to input its corresponding response. When all of the responses have been entered, the user selects the "Go" button 409, and the system attempts to authenticate the user.

Preferably, the questions 403A, 405A, and 407A are selected randomly, such as described below. That is, when a user first accesses the system, the system selects a first combination of the questions 403A, 403B, and 403C, which are then presented to the user. When a user next accesses the system, the system selects a second combination of questions 403D, 403E, and 403F (not shown). Preferably, to increase the probability that the first combination differs from the second combination, each of the questions 403A-F is selected randomly. In one embodiment, the system nevertheless checks whether any of the questions 403A-F (1) are the same, (2) were asked recently, within either a time frame or a sequence of combinations asked, or (3) were asked in any way that would allow previous answers to be helpful to an unauthorized user. If, for example, the question 403D is the same as question 403A, another question is randomly selected and asked instead of question 403D.

The GUI 400 is presented to a user according to a user interface protocol. Referring to FIG. 7, user interface protocols according to the present invention present questions to a user (1) concurrently, (2) sequentially, or (3) in a multiple-choice format, to name a few formats. When a user interface protocol uses a "concurrent display," all of the blocks 403, 405, and 407 are presented to the user at one time. When a user interface protocol uses a "sequential display," the block 403 is presented to the user first. If the user enters the correct response, then the block 405 is then presented to the user. If the user enters the correct response, then the block 407 is presented to the user. If the user again enters a correct response, then the user is authenticated, allowed access to the system, and granted permission to access protected data based on his position. The next time the user accesses the system, the system displays questions different from 403A, 403B, and 403C.

Figure 8:
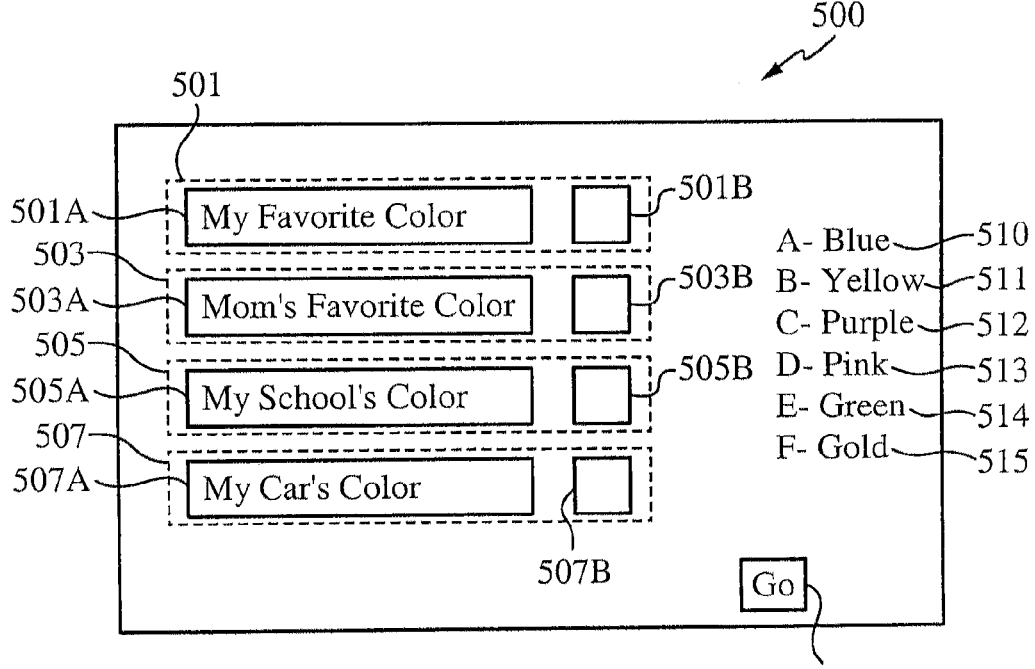
FIG. 8 shows another GUI displaying a combination of questions for challenging a user in accordance with the present invention.

In one example, when a user interface protocol uses a multiple-choice format, the GUI 500 shown in FIG. 8 is displayed. The GUI 500 displays a question area comprising a block 501 that contains a question 501A and an input area 501B for entering a letter corresponding to an answer to the question 501A; a block 503 that contains a question 503A and an input area 503B for entering a letter corresponding to an answer to the question 503A; a block 505 that contains a question 505A and an input area 505B for entering a letter corresponding to an answer to the question 505A; a block 507 that contains a question 507A and an input area 507B for entering a letter corresponding to an answer to the question 507A; and a "Go" button 520 for launching the authorization process. The GUI 500 also displays a candidate answer area containing multiple letter and answer pairs: the entry 510 with the letter "A" indicating the answer "Blue," the entry 511 with the letter "B" indicating the answer "Yellow," the entry 512 with the letter "C" indicating the answer "Purple," the entry 513 with the letter "D" indicating the answer "Pink," the entry 514 with the letter "E" indicating the answer "Green," and the entry 515 with the letter "F" indicating the answer "Gold." The letters A-F are input into the input areas 501B, 503B, 505B, and 507B. If the letters correspond to the answers that the user input into the system as the "correct answers," then the user is authenticated.

In one embodiment, the system requires that a user answer questions in a pre-determined order. As one example, the system is configured to authorize the user only if he answers the question 505A first, the question 501A next, the question 507A next, and the question 503A last. This is accomplished in one embodiment using event handlers, to make sure that the events corresponding to entering data in the areas 501B, 503B, 505B, and 507B occur in the following order: entering data in 505B, then 501B, then 507B, and finally 503B.

Those embodiments that use a multiple-choice format are able to include other security features. Referring to FIG. 8, for example, the authentication module requires that the user select only a subset of the questions 501A, 503A, 505A, and 507A for answering. If the user answers all of the questions or selects the wrong subset, he is not authorized. If the user provides the wrong answer to a question, even if the correct questions are selected, he is not authorized.

While the GUI 500 shows more answers than questions, it will be appreciated that GUIs in accordance with other embodiments of the present invention have the same number of questions and answers or more questions than answers, such as when only a subset of questions must be answered to authenticate a user.

It will also be appreciated that the system is able to be modified in many ways. For example, in one embodiment, a user learns that he has not been authorized as soon as he answers a question incorrectly. In other embodiments, the user learns that he has not been authorized only after he has attempted to answer all of the questions posed to him. In this way, the user does not learn which question he answered incorrectly, information he could use later when guessing at answers to the questions.

Figure 9:
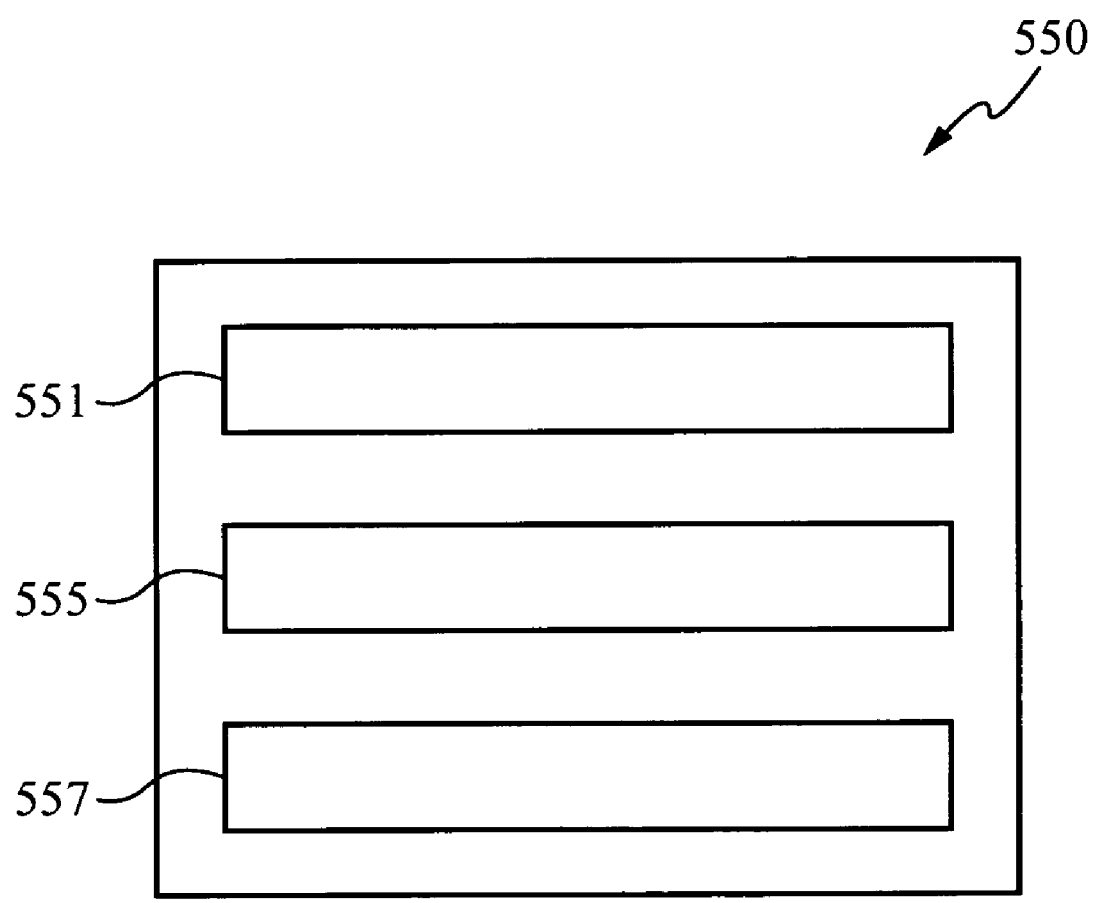
FIG. 9 shows a data structure for selecting a random combination of questions to challenge a user in accordance with the present invention.

FIGS. 9-15 are used to explain how questions are randomly selected according to one embodiment of the invention and how the system ensures that questions are not repeated too often. FIG. 9 shows an exemplary data structure 550 used to select one question in a combination of questions presented to a user. It will be appreciated that multiple data structures 550 are used to ask the combination of questions to a user. Thus, for example, when a combination of three questions are asked a user, the system requires three of the exemplary data structures 550.

The data structure 550 includes a first element 551, a second element 555, and a third element 557. In one embodiment, the element 557 stores a list of question and answer pairs in a "question and answer" array. The elements of the question and answer array are addressable and selected by indices, which, as described below, are randomly generated. In one embodiment, the indices are generated (and the question and answer pairs thus selected) using a pseudo-random number generator, generally referred to as a "PRNG," often supplied as a program library function. The element 551 stores a seed for the PRNG. The element 555 preferably stores an index or other identifier to the question last selected using the data structure 550.

Those skilled in the art will recognize other ways to generate a random number in accordance with the present invention. As one example, a system time function is called. On some systems, the system time function returns the number of seconds that have elapsed since a pre-determined date (Unix, for example, uses Jan. 1, 1970). The value returned by the function can be used as a random number that is modified such as by (1) truncation, (2) as the first operand to the modulus operator with the array size as the second operand, and (3) taking a subset (e.g., the fist three digits) of the value and again using the modulus operator with the array size as an operand. As another example, the system spawns a process, thereby generating a process identifier and modifies the process identifier in the same way as the value returned by the system time function. The spawned process is then killed to conserve system resources. In the discussions above and below, any sequence of numbers generated with good distributions, minimum repetition, and lack of predictability, whether generated using a pseudo-random number generator or not, is referred to as randomly generated numbers.

In operation, to generate a first question, the seed is supplied to the PRNG, thereby generating a first random number. The random number is then modified (such as by truncation or by using the modulus operator) to determine an index into the question and answer array. The question stored in the question and answer array at the index is then presented to the user.

In other embodiments, the first random number or an integer derived from it is used as an input to the PRNG, thereby generating a second random number. The second random number or an integer derived from it is used as an input to the PRNG, thereby generating a third random number. The third random number is then converted to an index into an array of question and answer pairs to select a question to challenge a user. The index can be determined, for example, by multiplying the number by a scale factor, truncating the remainder, and then using the modulus operator with the operand the total number of elements (e.g., questions) in the array.

These later embodiments improve randomness. As one example, a first random number is generated within the range of 1 to 3. This first generated random number is then input to a function (f) which receives inputs and generates a random number within a range of 1 to 18. The output of the function (f) is then input to a function (g), which receives inputs and generates a random number within a range of 1 to 36. The output of the function (g), is dependent on the randomly generated number and is said to function as $g(f(x))$, where x is a number in a range of 1 to 3. The output of $g(f(x))$ is used to generate an index into the question and answer array to randomly select questions for display to a user.

Conceptually, the random number generator based on the functions g and f are thought of as a three-wheel combination wheel, with the inner wheel corresponding to x, the middle wheel corresponding to the function f, and the outer wheel corresponding to the function g. It will be appreciated that the measure of randomness increases with the ranges of x, the function f, and the function g.

FIG. 10 shows an area 600 for use in a data structure used to track what questions and combinations of questions have already been asked and when they were asked. Because questions are always asked as part of a combination of questions, the area 600 is used to track all of the questions from the combination of questions. This is described more clearly in FIG. 12. In this embodiment, the system is set up to challenge the user with three questions from a pool of thirty-six questions. Thus, three data structures (e.g., 550) are used, one each to pose a question in the combination of questions.

The area 600 comprises a current question area 601, a previous question area 620, and a later question area 640. Each of the areas 601, 620, and 640 contains a table with rows that store index and time pairs. Thus, for example, the exemplary area 601 contains rows 605-607. The row 605 contains a first entry 605A and a corresponding second entry 605B. The first entry 605A contains the value "10," which indicates that the current question to pose is stored in the question array at index 10. The second entry 605B contains the value "0001," which indicates that the question at index 10 was asked "0001" time units (e.g., seconds) ago. Similarly, the row 606 contains a first entry 606A and a corresponding second entry 606B. The value "8" in the first entry 606A and the value "0004" in the corresponding second entry indicate that the question at index 8 in the question array was asked "0004" time units ago.

The previous question area 620 and the subsequent question area 640 both contain corresponding index and time pairs indicating questions and times they were asked, selected for another question in the combination of questions. Preferably, the question and answer pairs are selected from the same question array so that the indices 605A, 606A, 607A, 621A, 622A, 623A, 641A, 642A, and 643A all refer to questions in the same or copies of the same question and answer array.

Figure 11:
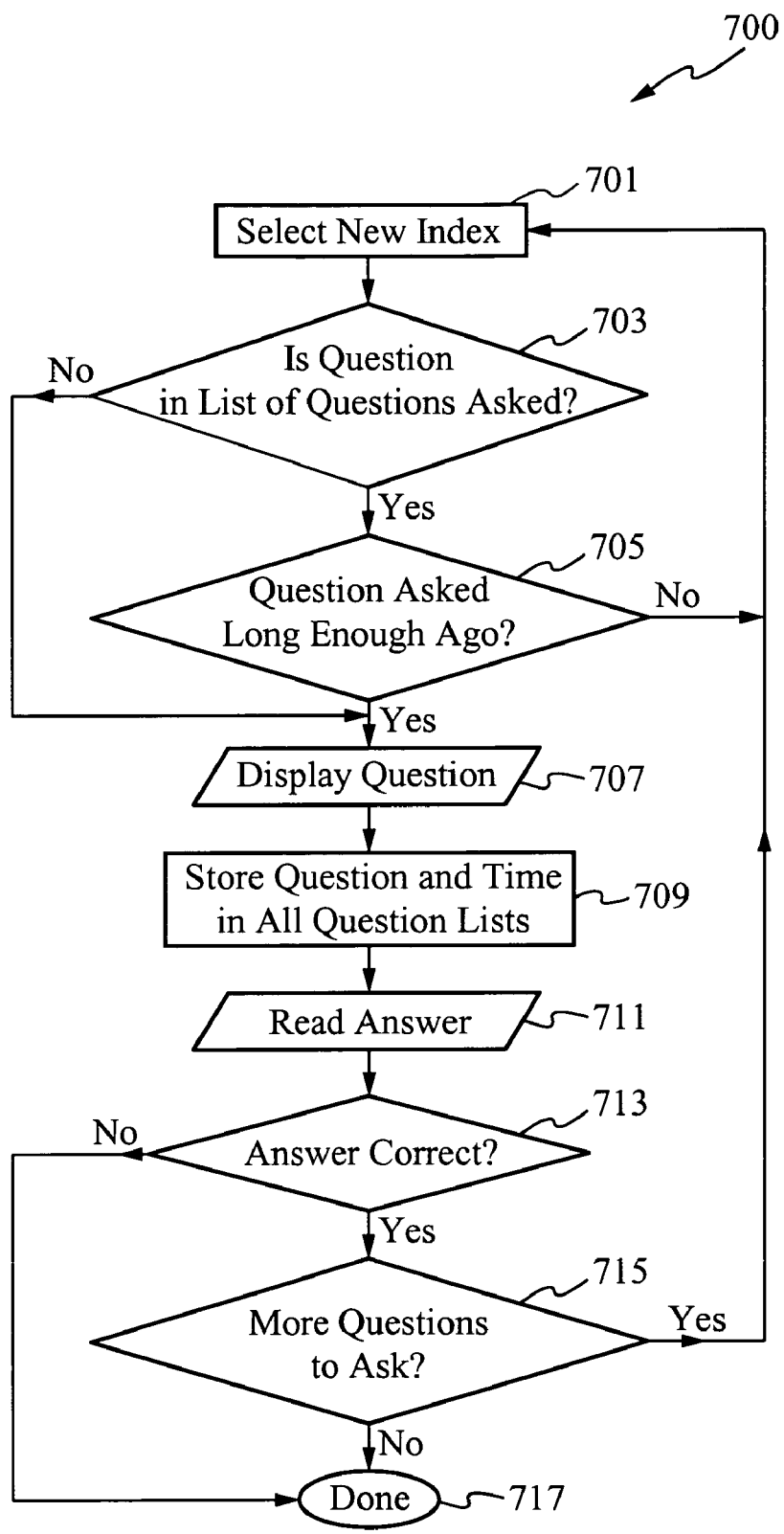
FIG. 11 shows steps for tracking questions displayed in accordance with the present invention.

FIG. 11 shows the steps 700 of a process for using the data structure 600 in accordance with one embodiment of the present invention. Referring to FIGS. 10 and 11, in the step 701, an index is randomly generated, thereby selecting a question stored in a question and answer array at the index. Next, in the step 703, the process determines whether the question was asked before, as shown by its entry in the data structure 600. This determination is made by checking whether the index is stored in any of the entries 605A, 606A, 607A, 621A, 622A, 623A, 641A, 642A, and 643A (collectively, the "system index entries"). If the index is not among the system index entries, the process continues to the step 707, where the question is displayed. Otherwise, the process continues to the step 705, where the process determines whether the question was asked sufficiently long ago. For example, if the question was asked a year ago, the system assumes that an unauthorized user either has not seen the question before or cannot remember the answer, and thus allows the question to be asked. This determination is made by checking the corresponding timestamp for the entry containing the index, stored in one of the entries 605B, 606B, 607B, 6211B, 622B, 623B, 6411B, 642B, and 643B.

In the step 707, the question (among the combination of questions asked) is displayed to the user. Next, in the step 709, the index to the question and its current timestamp is stored in the area 601 and also in the areas 620 and 640 of data structures used to ask the other questions in the combination of questions. In this way, the data structures used to ask the other questions can also keep track of the questions asked. Preferably, the data structures 601, 620, and 640 are implemented as "stack" data structures, so that new index and timestamps are pushed onto the top of the data structures 601, 620, and 640. The bottom element of the stack is discarded, indicating that it is "old" and thus was asked long enough ago that it can be asked again. Preferably, the data structures 601, 620, and 640 are able to store many more than 3 elements each (e.g., rows 605A, 606A, and 607A). Only in this way can "old" elements truly be considered old enough that they can be asked again.

Next, in the step 711, the answer input by the user is read and, in the step 713, compared with the correct answer stored in the system. If the answer is correct, the process proceeds to the step 715, where it is determined whether any more questions are to be asked. If more questions are to be asked, the process loops back to the step 701; otherwise, the process continues to the step 717, where the process ends. Similarly, if in the step 713, the process determines that the answer is incorrect, then the process also continues to the step 717, where the process ends.

Figure 12:
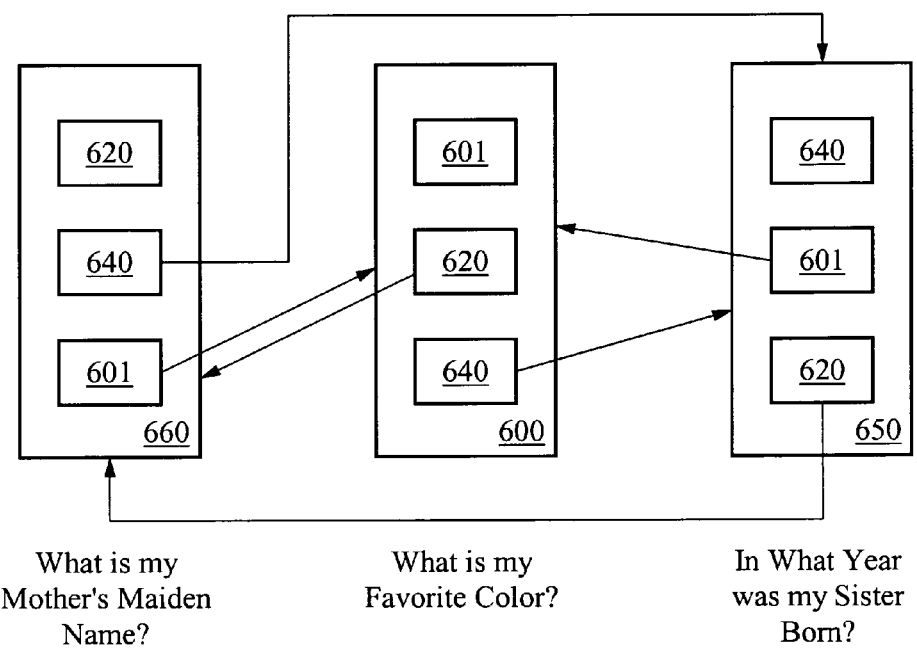
FIG. 12 shows the data structure of FIG. 10 and similar data structures, all used to track questions already asked in accordance with the present invention.

FIG. 12 shows the data structure 600 of FIG. 10, used to select one question to ask as a combination of questions asked during the authorization step. FIG. 12 also shows a data structure 660 for asking a second question and a data structure 650 for asking a third question, both also part of the combination of questions. Similarly labeled components refer to the same or identical copies of the same component. It will be appreciated that a combination of questions can include more than three questions, and if it does, a corresponding number of data structures similar to the data structure 600 are used.

The arrows shown in FIG. 12 connect a data structure 601, 620 and 640 with the corresponding questions posed to a user. For example, the arrow from the element 620 in the data structure 600 (referred to as the element 600-620) pointing to the data structure 660 indicates that the element 600-620 contains the questions and corresponding timestamps selected using the data structure 660. Other elements in FIG. 12 are similarly labeled AAA-BBB, where AAA refers to a data structure and BBB is the element within the data structure AAA. In one embodiment, the questions selected using the data structure 660 are the first questions in the combination of questions posed to a user. FIG. 12 thus shows that the data structure 660 contains a list of questions and timestamps (660-601) selected using the second data structure 600 for display to a user and a list of questions and timestamps (660-640) selected using the third data structure 650. The remaining arrows are similarly explained. In this way each data structure keeps track of all the questions presented in the other question "slots." For example, the data structure for asking the first questions in all the combinations tracks all the second questions and also all the third questions asked.

The elements 660-620, 600-601, and 650-640, without arrows, indicate the questions selected and currently displayed using the data structures 660, 600, and 650, respectively. The questions currently displayed by each of the data structures 660, 600, and 650 are shown below them. Thus, using the indices as shown in FIG. 10, FIG. 12 illustrates that the data structure 660 is used to currently display the question at index 6 of the question and answer array: "What is my mother's maiden name?" The data structure 600 is used to currently display the question at index 10 of the question and answer array: "What is my favorite color?" And the data structure 650 is used to currently display the question at index 0 of the question and answer array: "In what year was my sister born?"

Those skilled in the art will recognize other data structures that are able to be used in accordance with the present invention, such as objects generated using an object-oriented programming language. As one example, an authorization module contains three similar data structures (A, B, C), each used to randomly generate and thereby randomly select a question presented to a user as part of an authorization process. Each of the data structures A, B, and C contains a data element similar to the element 601 in the data structure 600 of FIG. 12. The exemplary data element in the structure A contains the list of questions selected using the structure A. Rather than containing the lists of questions selected using the structures B and C, however, the structure A merely contains pointers to the structures B and C. These pointers are used to access the lists of questions selected using the structures B and C. This embodiment eliminates the need for the exemplary data structure A to keep copies of the questions selected using the data structures B and C.

It will be appreciated that many other data structures are able to be used in accordance with the present invention. FIG. 13 shows a question and answer array 800; FIGS. 14A-C show a first array 820 and a second array 840, each for selecting a question in a combination of questions presented to a user, during different times that a system is authenticating a user. The question and answer array 800 has thirty-six rows 801-804, each containing a question and answer pair. In this embodiment, only a single copy of the question and answer array 800 is required.

Referring to the exemplary row 801, each row 801-804 is labeled with an index number (e.g., the label "[0]" 801A) and contains a question (e.g., "What is my mother's maiden name?" 801B) and a corresponding answer (e.g., "Smith" 801C), a question and answer pair. Those skilled in the art will recognize the format of an array. Question and answer pairs in the question and answer array 800 are selected by a user during an initialization process. When selecting a question to present during an authentication process of the present invention, an index (e.g., 801A) is randomly selected and the corresponding question (e.g., 801B) is presented to a user. The user's response is received and compared with the corresponding answer (e.g., 801C) stored on the system to determine if the user is authorized to use the system and thus access data on the system.

The first and second arrays 820 and 840 are used to store indices into the question and answer array 800. In this embodiment, as explained below, the first and second arrays 820 and 840 are able to be used to increase the randomness of questions presented to a user. FIG. 14A shows the first and second arrays 820 and 840 when the user attempts to log on to the system a first time, FIG. 14B, when the user attempts to log on a second time, and FIG. 14C, when the user attempts to log on a third time. FIGS. 14A-C also show, for illustration only, the indices of the first array 820 in the column 825 and the indices of the second array 840 in the column 845. Thus, for example, referring to FIG. 14A, the entry labeled "[0]" (column 825) refers to the 0th entry in the array (using "0" as the starting index), with the corresponding entry (e.g., "firstarray[0]") having the value "0" (column 820). Entries in the array 840 are similarly labeled.

On initialization, the first array 820 contains the indexes to the question and answer array 800. In this example, the value in each entry of the first array 820 contains the value of its own index. Thus, the 0th entry ([0]) of the first array 820 contains the value "0" and the thirty-fifth entry ([35]) contains the value "35." Initially, all the entries of the second array 840 are "don't care values," indicated by an "x."

In operation, a random number generator generates a first number between 0 and 35, inclusive, indicating the first question to present to a user during the authorization process. In this example, the random number generator generates the number 2, indicating that the question at the index 2 of the question and answer array 800 (803B) is displayed to a user during the authorization process, and the user's answer compared with the answer at index 2 of the question and answer array (803C). The index 2 is stored at the next available entry (e.g., the entry with the lowest index containing an "x") of the second array 840 (here, at index 0).

As described in more detail below, the first array 820 is initially used to store indexes into the question and answer array 800 of questions that have yet to be presented to a user; the second array 840 is initially used to stored indexes into the question and answer array 800 of questions that have already been presented. A "current authorization cycle" is used to refer to a sequence of combinations of questions that are presented before exhausting all the stored questions to a user. Thus, if 36 question and answer pairs are stored in the question and answer array 800, and each combination contains three questions, the current authorization cycle contains 36/3 or 12 combinations of questions. That is, after 12 combinations of questions have been presented to a user, all of the questions stored in the system have been presented. The user now has the option to answer different or additional question and answer pairs into the system. The first array 820 is called the "source array" (during this authorization cycle) because it provides indexes to the questions to be presented and the second array is called the "spent array" because the indexes to questions already presented are stored there.

Continuing with this example, the index 0 (generated by the random number generator) is selected next so that the element 0 of the of the question and answer array 800 is presented. The index 0 is stored at the next available entry of the second array 840 (here, index 1). Finally, the index 35 is selected in the same manner, so that the question at index 35 of the question and answer array 800 is presented. The value "35" is stored at the next available entry of the second array 840 (here, index 2). In this example, a user is presented with three questions (the randomly selected combination of questions) as part of the authorization process.

FIG. 14B shows the first array 820 and the second array 840 at the end of the first authorization process. It will be appreciated that the first array 820 now has 33 elements, with the last element stored at index 33. Because the entries at indices 34-36 are not used during the current authorization cycle, they are shown as "don't care values." The random number generator must now generate numbers between 0 and 33 instead of 0 and 36. FIG. 14B also shows that the elements in the first array 820 have been "slid up" so that if an entry contains an index corresponding to a question that was already presented in the current authorization cycle, it is replaced by the index of the next-highest numbered entry. This "sliding up," of course, can occur as soon as a question is presented.

FIG. 14C shows the first array 840 and the second array 840 after the current authorization cycle is completed. Here, after 12 three-question combinations (36 questions) have been presented and 12 answers received. The second array 840 is now regarded as the source array and the first array 820 as the spent array, and the process continues. In some embodiments, the system now asks the user whether he would now like to input different entries into the question and answer array 800 or to add additional entries. It will be appreciated that the "new" source array 840 contains entries that have been randomly stored because they were stored based on the output of a random number generator. Thus, when a random number generator is used to select the indices (e.g., to select the questions in the question and answer array 800) from the new source array 840, the system now contains two-levels of randomness. The randomness of selecting questions is thus increased each time the use of the arrays 820 and 840 as the source array and the spent array are switched. As another advantage, because during an authorization cycle indexes are deleted from the source array, the probability of repeating questions during a single authorization cycle is eliminated.

Figure 15:
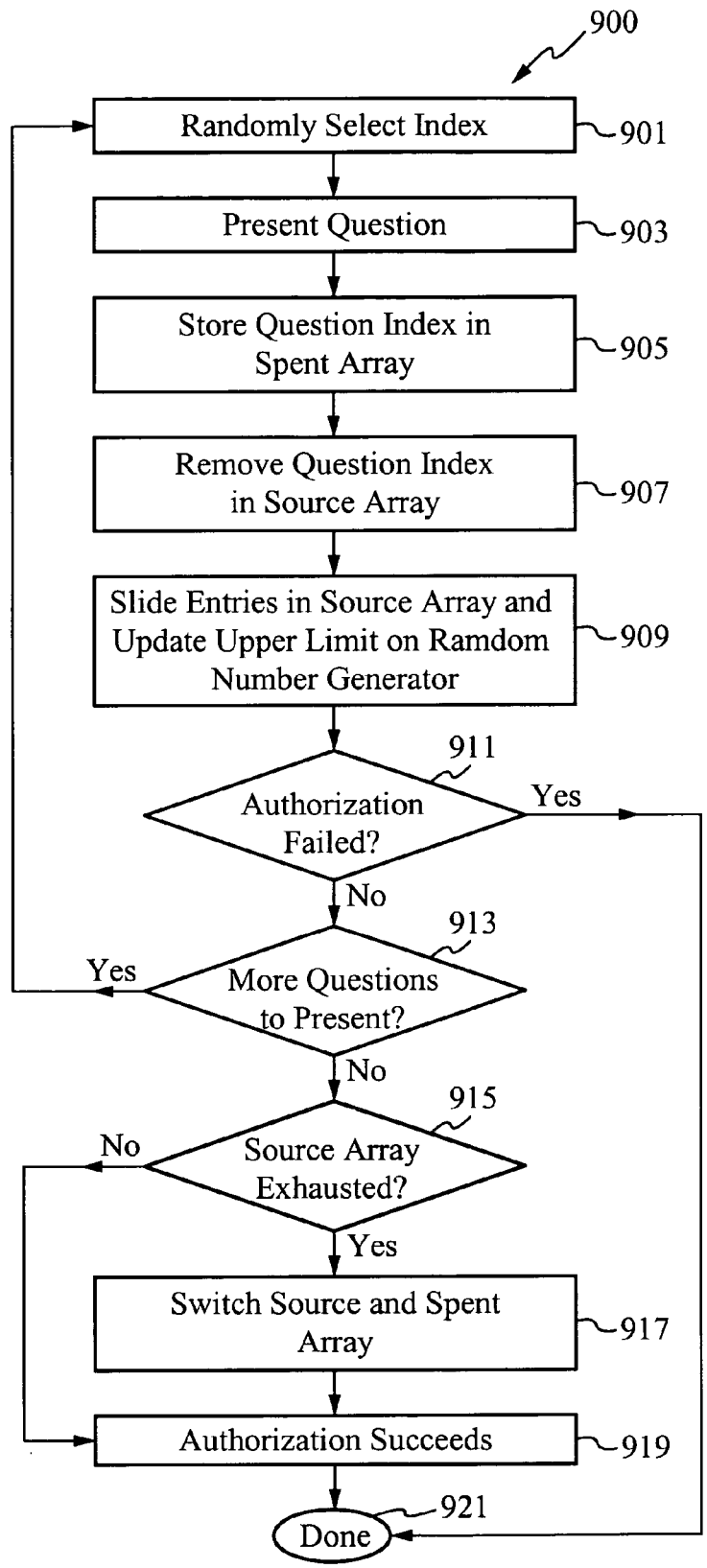
FIG. 15 shows steps for using the data elements in FIGS. 13 and 14A-C in accordance with one embodiment of the present invention.

FIG. 15 shows the steps 900 of a process for randomly selecting questions using data structures similar to those in FIGS. 13 and 14A-C. First, in an initialization step (not shown), the question and answer array is populated by a user and a source array is initialized. In the step 901, an index into the question and answer array 800 is randomly selected, such as described above. Next, in the step 903, the question in the question and answer array stored at the index is presented to a user. In the step 905, the index is stored in the spent array; in the step 907, the index is removed from the source array; and in the step 909, the entries in the source array are slid to replace the entry at the selected index, and the upper limit of the random number generator is updated to account for the fewer indexes that can be selected.

Next, in the step 911, it is determined whether the authorization failed; that is, if the user did not supply the correct answer to the selected question. If the authorization failed, the process continues to the step 921, where the process completes. Otherwise, the process continues to the step 913, where it determines whether there are more questions to present (e.g., whether all three questions in the authorization process have been presented). If there are more questions to present, the process loops back to the step 901; otherwise, the process continues to the step 915. In the step 915, the process determines whether the source array is "exhausted"; that is, whether it contains questions that have not been presented during the current authorization cycle. If the source array is not exhausted, the process continues to the step 919, where the authorization step is determined to succeed, and then continues to the step 921. If, in the step 915 it is determined that the source array has been exhausted, the process continues to the step 917, where the system now recognizes the source array as the spent array and the spent array as the source array. From the step 917, the process continues to the step 919 and then completes in the step 921.

In operation, a user configures a system to authenticate him. During an initialization stage, the user generates a series of questions, preferably personal questions, and supplies corresponding answers. As additional authorization steps, the user is able to select (1) a sequence for answering the questions, (2) one or more questions that should not be answered, (3) "incorrect" answers that must be supplied, or (4) any combination of these. During the initialization step, the user is able to configure the interface for presenting the questions and receiving the answers. The system is also configured to determine the user's position in an organization and accordingly grant permissions for the user to access data. The user is able to later change or supplement the question and answers and other authorization steps. The user's permissions may also be configured over time as the user's position within the organization changes.

When the user later logs on to the system, the system challenges her with the questions. The questions are selected randomly, to ensure that questions are not asked frequently enough to compromise the security of the system. The system matches the user's responses to those stored in the system, checking that she also entered her responses in accordance with any additional verification steps. Once the user is verified, the system allows her to access data according to the permissions granted to her. As one example, her permissions allow her to access data owned by a particular department but not data owned by a particular business unit.

It will be readily apparent to one skilled in the art that other various modifications may be made to the embodiments without departing from the spirit and scope of the invention as defined by the appended claims.

I claim:

1. A method of controlling access to a system comprising: performing a test that includes comparing multiple input responses to multiple randomly selected questions with multiple corresponding pre-determined responses to the multiple questions; and
granting access to the system in the event the test is passed, by providing a user with a key for encrypting data on the system, a key for decrypting data on the system, or both keys, wherein the keys correspond to a hierarchical position of the user in an entity owning the data, the keys are shared among all users at the hierarchical position, the keys allow encryption and decryption of data belonging to users at positions lower than the hierarchical position, and encryption and decryption are performed automatically, without the user interfering, in response to write and read commands, respectively, on the system.

2. The method of claim 1, wherein a first condition of passing the test is that each input response from the multiple input responses matches a corresponding one of the multiple pre-determined responses.

3. The method of claim 1, further comprising presenting the multiple questions sequentially.

4. The method of claim 1, further comprising presenting the multiple questions concurrently.

5. The method of claim 1, further comprising presenting questions and candidate responses in a multiple choice format.

6. The method of claim 1, wherein a first condition of passing the test is providing responses to only a pre-determined subset of the multiple questions presented to a user.

7. The method of claim 1, wherein granting access to the system comprises decrypting non-authentication information on the system using a decryption key.

8. The method of claim 1, further comprising selecting a question from the multiple questions for presentation based on a time that the question was last displayed.

9. The method of claim 1, further comprising selecting a question from the multiple questions for presentation based on a number of times the question was displayed within a pre-determined time period.

10. The method of claim 1, further comprising authorizing a user to access the system only if the user answers the questions in a pre-determined user-selected sequence different from a sequence presented to the user, does not answer one or more pre-determined user-selected questions presented to the user, or supplies a corresponding pre-determined user-selected incorrect answer to one or more of the questions.

11. The method of claim 1, wherein the keys are of multiple encryption and decryption keys having increasing rights of access to the system.

12. The method of claim 2, wherein a pre-determined response from the multiple pre-determined responses is a pre-determined correct answer that corresponds to a question from the multiple questions.

13. The method of claim 2, wherein a pre-determined response from the multiple pre-determined responses is a pre-determined incorrect answer to a question from the multiple questions.

14. The method of claim 2, wherein a second condition of passing the test is entering the multiple input responses into the system during the test in a pre-determined sequence different from the sequence that the multiple questions are displayed during the test.

15. The method of claim 5, further comprising presenting candidate responses that include both correct and incorrect answers to the multiple questions.

16. The method of claim 6, wherein the test is failed by selecting a question from the multiple questions for which there is no corresponding pre-determined response.

17. A method of controlling access to an area from among different areas of a system, each of the different areas having a different hierarchical security classification, the method comprising:
   selecting a combination of questions for presentation to a user;
   determining access permissions for the user to the area using a vector that associates a hierarchical classification of the user to the access permissions, wherein the vector contains permissions vectors for separate hierarchical classifications in a business entity;
   granting the user access to the area based on both responses to the combination of questions and the access permissions, such that the user can encrypt and decrypt data, automatically, without the user interfering, in the area belonging to users having a classification lower than the hierarchical classification, wherein a same number of questions are answered to determine access permissions to any of the different areas; encrypting a response input by the user using an encryption key to generate an encrypted input response; and
   granting access to the system in the event that the encrypted input response matches a corresponding encrypted system response.

18. The method of claim 17, wherein the classification corresponds to a membership of the user in one or more of a corporation, a division, a department, a group, and a project.

19. The method of claim 17, wherein the area of the system corresponds to any one or more of a disk partition, a file system, a portion of a database, a directory, an electronic folder, an electronic file, and a data object.

20. The method of claim 17, wherein the combination of questions is randomly selected.

21. The method of claim 17, wherein granting access to the area comprises determining permissions to the area corresponding to the classification.

22. The method of claim 17, wherein the classification has a hierarchical structure that corresponds to an organizational structure of an entity.

23. The method of claim 20, further comprising displaying the combination of questions using a user interface protocol.

24. The method of claim 23, wherein the user interface protocol comprises displaying candidate responses to the questions as multiple choices.

25. The method of claim 17, wherein granting access to the system comprises decrypting the area of the system using a decryption key corresponding to the encryption key.

26. A module for controlling access to a system comprising:
   means for randomly selecting a combination of questions; and
   means for granting access to the system in the event multiple user responses to the questions match corresponding multiple pre-determined responses to the questions, wherein granting access comprises providing a user with a key for encrypting data on the system, a key for decrypting data on the system, or both keys, the keys corresponding to a hierarchical position of the user in an entity, the keys are shared among all users at the hierarchical position, the keys encrypt and decrypt data belonging to users at positions lower than the hierarchical position, and encryption and decryption are performed automatically, without the user interfering, in response to write and read commands, respectively, on the system.

27. The module of claim 26, further comprising means for presenting the combination of questions.

28. The module of claim 26, wherein the means for randomly selecting a combination of questions comprises a memory for storing information for tracking questions presented to a user.

29. The module of claim 27, wherein the means for presenting displays the combination of questions sequentially.

30. The module of claim 27, wherein the means for presenting displays the combination of questions concurrently.

31. A module for controlling access to data on a system comprising:
   a processor;
   a generator component for presenting a randomly selected combination of questions to a user for authenticating the user on the system; and
   a grant component for granting access to encrypt and decrypt the data based on permissions granted to the user and on responses of the user to the combination of questions, wherein the permissions correspond to a hierarchical classification of the user in an entity owning the data, the permissions stored in a single vector comprising a first sub-vector indicating the user's membership in sections of the entity, the sections having different hierarchical levels, and from a second sub-vector indicating access rights to the data for each of the sections, wherein granting access to the system comprises granting access to one of an encryption key, a decryption key, or both, for accessing non-authentication data on the system.

32. The module of claim 31, wherein the classification of the user corresponds to any one or more of a corporation identifier, a division identifier, a business identifier, a department identifier, a group identifier, and a user identifier.

33. A network of devices comprising:
   one or more user devices; and
   an access control module for granting access to protected data to multiple users using the user devices, wherein the data have different hierarchical levels, access rights to the data for each user from the multiple users is determined in an authorization sequence and is based on a position of the user in an organization, on a vector associating access permissions to the protected data with the position, and on multiple responses of the user to a combination of randomly selected questions, the vector comprising permission vectors for separate hierarchical levels in a business entity, and a number of steps in the authorization sequence is independent of a hierarchical level of the data, wherein the protected data comprises any one or more of an encrypted disk partition, an encrypted file system, an encrypted portion of a database, an encrypted directory, an encrypted electronic folder, file, an encrypted data object, and further wherein encryption is performed automatically, without the user interfering.

34. The network of claim 33, wherein the position of a user corresponds to a membership of a user in any one of a corporate unit, a division, a business unit, a department, a group, and a team.

35. The network of claim 33, wherein the vector associates multiple hierarchical positions with multiple access permissions.

36. A method of granting a user access to encrypted data on a system comprising:
- determining that the user has answered multiple randomly selected questions to thereby verify an identity of the user;
- providing the user a decryption key corresponding to a position of the user in an entity in response to verifying the identity of the user, wherein the decryption key is one of multiple decryption keys for the system each corresponding to a position in the entity; determining from a name of the user and the decryption key, an owner, a department, and a data access permissions vector for the user; and
- using the owner, the department, and the data access permissions vector to decrypt the encrypted data, automatically, without the user interfering.

37. A method of granting a user access to data on a system comprising:
- determining that the user has provided pre-determined answers to multiple randomly selected questions, thereby authenticating the user, wherein a number of the questions is independent of a hierarchical classification of the data;
- determining permissions for the user to access the data based on a position of the user in an entity; and
- granting the user access to the data by encrypting the data, decrypting the data, or both using an encryption key and a corresponding decryption key corresponding to the position, wherein each of the encryption key and the decryption key encrypts or decrypts data owned by users at that position and at any lower positions, and encryption and decryption are performed automatically, without the user interfering, in response to write and read commands, respectively, on the system.

* * * * *